United States Patent [19]
Suzuki et al.

[11] Patent Number: 5,759,315
[45] Date of Patent: Jun. 2, 1998

[54] PNEUMATIC RADIAL TIRE WITH INNER CARCASS PLY NOT WRAPPED AROUND BEAD CORES

[75] Inventors: Kazuya Suzuki; Nobuaki Minami, both of Shirakawa, Japan

[73] Assignee: Sumitomo Rubber Industries, Ltd., Hyogo-ken, Japan

[21] Appl. No.: 525,180

[22] Filed: Sep. 8, 1995

[30] Foreign Application Priority Data

Sep. 12, 1994 [JP] Japan ................................ 6-244620
Feb. 24, 1995 [JP] Japan ................................ 7-062049

[51] Int. Cl.$^6$ .................. B60C 9/08; B60C 15/00; B60C 15/06
[52] U.S. Cl. .................. 152/543; 152/547; 152/550; 152/552
[58] Field of Search .................. 152/550–552, 152/548, 539, 543, 542, 547

[56] References Cited

U.S. PATENT DOCUMENTS

| | | | |
|---|---|---|---|
| 1,682,922 | 9/1928 | McKone | 152/543 X |
| 2,000,869 | 5/1935 | Taylor | 152/543 |
| 2,131,636 | 9/1938 | Nellen | 152/543 |
| 2,155,564 | 4/1939 | Schippel | 152/543 X |
| 3,302,681 | 2/1967 | Travers | 152/550 X |
| 3,386,486 | 6/1968 | Kovac et al. | |
| 5,427,166 | 6/1995 | Willard, Jr. | 152/550 X |
| 5,538,572 | 7/1996 | Sakamoto et al. | 152/557 X |

FOREIGN PATENT DOCUMENTS

| | | | |
|---|---|---|---|
| 1404543 | 11/1965 | France. | |
| 2356527 | 1/1978 | France. | |
| 62-152907 | 7/1987 | Japan | 152/550 |
| 5-178033 | 7/1993 | Japan | 152/539 |
| 1166329 | 10/1969 | United Kingdom. | |
| 1565574 | 4/1980 | United Kingdom. | |

*Primary Examiner*—Adrienne C. Johnstone

[57] ABSTRACT

A pneumatic radial tire comprises a carcass comprising an inner and outer plies, a belt comprising at least one ply of cords laid at an angle of from 0 to 35 degrees with respect to the tire circumferential direction, and a rubber bead apex disposed in each bead portion. The outer carcass ply comprises a main portion extending continuously between the bead portions, and a pair of turnup portions each turned up around a bead core from the axially inside to outside of the tire. The inner carcass ply is disposed inside and adjacent to the main portion and extending at least from the tread portion to the bead portions. The inner carcass ply is not wrapped around the bead core, and the radially inner end thereof is located radially inward of the radial outer end of the bead apex.

8 Claims, 8 Drawing Sheets

CONVENTIONAL ART

Fig. 8 (B)

CONVENTIONAL ART

COMPARATIVE

Fig. 11
COMPARATIVE

PNEUMATIC RADIAL TIRE WITH INNER CARCASS PLY NOT WRAPPED AROUND BEAD CORES

BACKGROUND OF THE INVENTION

The present invention relates to a pneumatic radial tire having an improved carcass structure.

Figure 5:
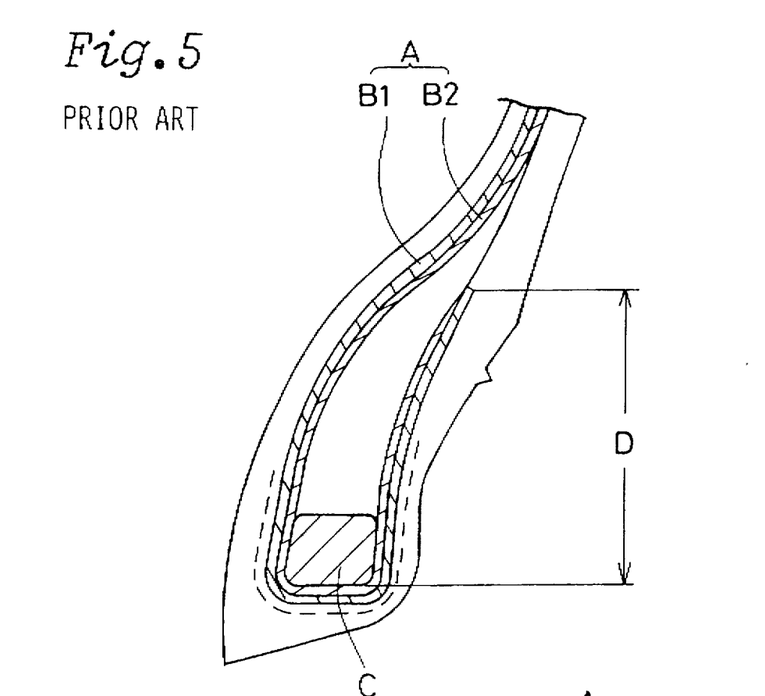
FIGS. 5–7 are cross sectional views, each showing the prior art.

In the high performance tires for passenger cars, a so called 2-0 carcass structure shown in FIG. 5 is usually and conventionally used. In this structure, the carcass (A) consists of two carcass plies B1 and B2, each turned up around a bead core C from axially inside to axially outside of the tire.

Figure 6:
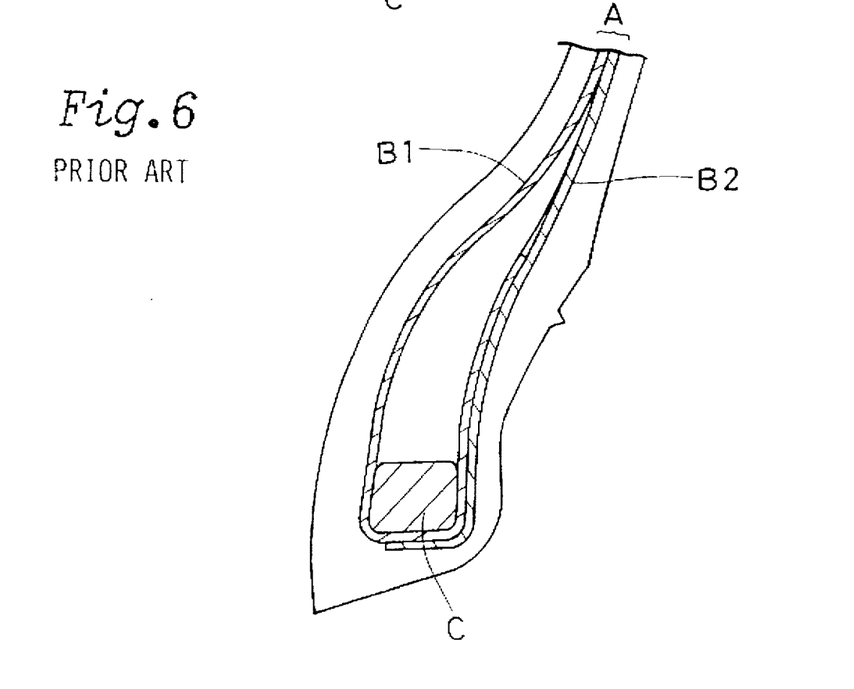

Further, a so called 1—1 carcass structure shown in FIG. 6 is also used. In this structure, the carcass (A) consists of an inner carcass ply B1 turned up around a bead core C from axially inside to axially outside, and an outer carcass ply B2 is wrapped around the bead core C from axially outside toward the inside to cover the turned portion of the inner carcass ply B1.

The above-mentioned 2-0 carcass structure provides a sufficient vertical and lateral stiffness for the tire, but due to its relatively large turned up hight D, the tire weight is inevitably increased.

On the other hand, in the 1—1 carcass structure, the tire weight can be decreased by eliminating the turned up portion from the outer carcass ply. However, to make such a tire, further steps are required to wrap the outer carcass ply in addition to the steps of turning up of the inner carcass ply. Therefore, the production efficiency is lower than the former carcass structure.

In Japanese patent publication No. 62-33082, a carcass structure capable of solving those problems was proposed. In this structure, as shown in FIG. 7, an inner carcass ply B1 is turned up around a bead core C from axially inside to axially outside, but an outer carcass ply B2 is not turned up around the bead core but rather terminates between the main portion of the inner carcass ply B1 and the axially inner surface of a bead apex E.

Figure 7:
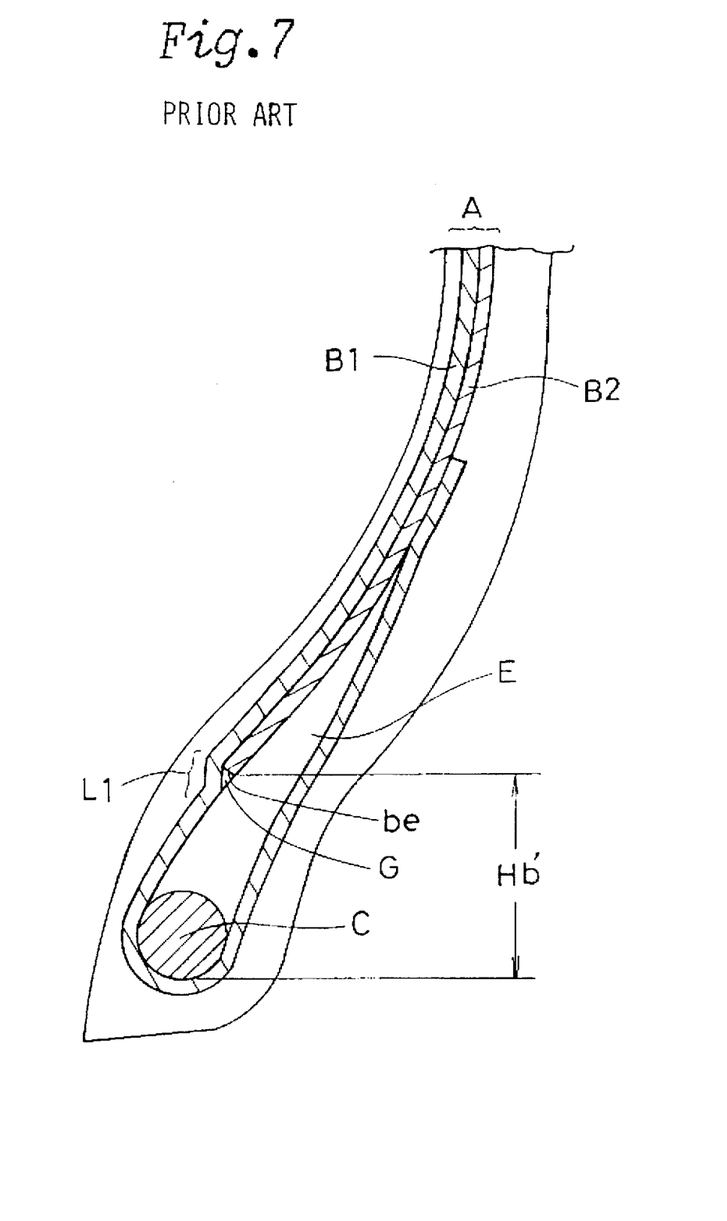
Figure 8:
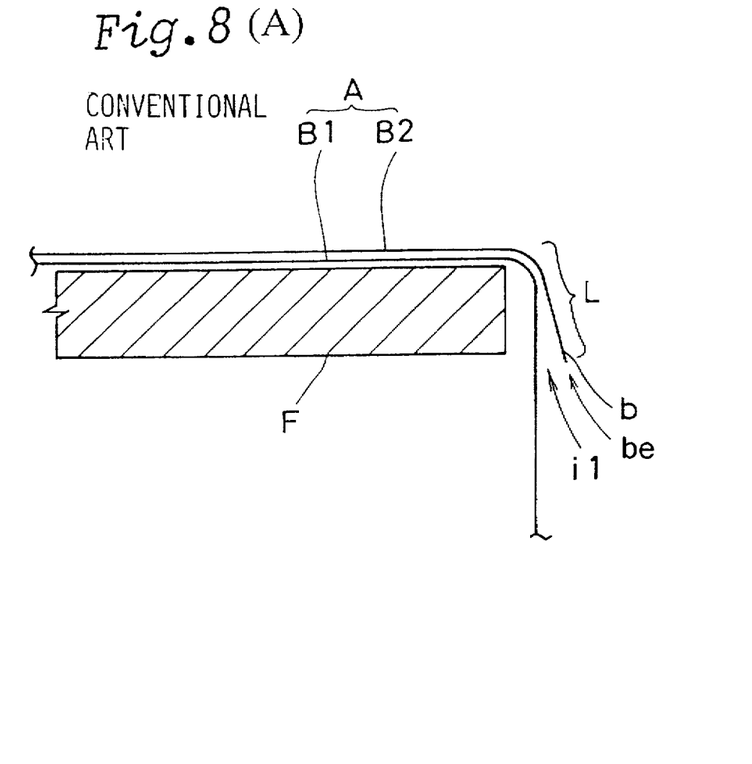

In this structure, when making the carcass (A) on a former (F) or shaping drum by laminating raw carcass plies B1 and B2 as shown in FIG. 8 (A), the end (be) of the outer carcass ply B2 is liable to form a space (G) filled with air as shown in FIG. 7.

Further, since the length (L) of the bent part (b) of the outer carcass ply B2 is too small, a separation (i1) of the bent part (b) from the inner carcass ply B1 is liable to occur due to its spring back property.

Furthermore, as shown in FIG. 8 (B), when the edge of the inner carcass ply B1 is turned up around the bead core C, the above-mentioned bent part (b) is liable to form a crease (part i2) between the inner carcass ply and the bead core C or bead apex E.

These problems not only lower the tire production efficiency but also deteriorate the bead durability and the tire uniformity, such as the radial force variation (RFV), the lateral force variation (LFV), the conicity (CON) and the like.

SUMMARY OF THE INVENTION

It is therefore, an object of the present invention to provide a pneumatic radial tire, in which the bead durability, tire uniformity and production efficiency can be improved without increasing the tire weight.

According to one aspect of the present invention, the pneumatic radial tire comprises a tread portion, a pair of axially spaced bead portions with a bead core therein, a pair of sidewall portions therebetween, a carcass comprising an outer ply and an inner ply, the outer ply comprising a main portion extending continuously from axially inside of one of the bead cores to axially inside of the other bead core through the sidewall portions and the tread portion of the tire, and a pair of turned up portions each turned up around each of the bead cores from axially inside to axially outside of the tire, the inner ply disposed inside and adjacent to said main portion and extending at least from the tread portion to the bead portions through the sidewall portions, the inner ply having radial inner ends which are not wrapped around the bead cores, a belt disposed radially outside the carcass and inside the tread portion, the belt comprising at least one ply of cords laid at an angle of from 0 to 35 degrees with respect to the circumferential direction of the tire, a rubber bead apex disposed between the main portion and each turnup portion of the carcass and extending radially outwardly from each of the bead cores, and the radially inner end of the inner carcass ply disposed radially inward of the radial outer end of the rubber bead apex.

Therefore, as the radially inner end of the inner carcass ply terminates radially outward of the inner end of the bead core, without being turned up around the bead core, the width of the inner carcass ply is greatly decreased.

The outer carcass ply is turned up around the bead core, passing through the minimum path. Therefore, when compared with the structure proposed in the above-mentioned JP 62-33082 and shown in FIG. 7 in which the inner carcass ply B1 extends across the end (be) of the outer carcass ply B2, the ply width is further decreased by a length corresponding to the length L1 of the crossing part. Accordingly, a further weight reduction is possible.

When making the carcass, it becomes possible to come out the end of the inner carcass ply to the surface, without being covered. As a result, the occurence of an air filled space at the ply end is easily avoided, for example by rubberizing.

As the outer carcass ply is wider than the inner carcass ply, the inner carcass ply is prevented from creasing during shaping the carcass. Further, the bent part of the inner carcass ply causes spring back towards the outer carcass ply during shaping, whereby a ply separation can be prevented.

Therefore, a pneumatic radial tire according to the present invention can be improved in tire uniformity, bead durability and production efficiency while reducing tire weight.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8 (A) and (B) are schematic cross sectional views explaining the problems in the carcass structure of FIG. 7 arising from conventional manufacturing methods.

DETAILED DESCRIPTION OF THE INVENTION

In the drawings, tire 1 according to the present invention is mounted on a standard rim J and inflated to its standard inner pressure specified by, for example JATMA (Japan), TRA (USA), ETRTO (Europe) and the like. Each embodiment is a passenger radial tire having a low aspect ratio H/W (the ratio of the tire section height H to width W) of not more than 0.80, for example about 0.60.

The tire 1 comprises a tread portion 2, a pair of axially spaced bead portions 4 with a bead core 5 therein, and a pair of sidewall portions 3 extending between the tread edges and the bead portions.

The tire 1 is provided with a carcass 6 extending between the bead portions 4, and a belt 7 disposed radially outside the carcass 6 and inside the tread portion 2.

The belt 7 comprises at least one ply of metal (steel) fiber cords or organic fiber cords, e.g. nylon, polyester, rayon, aromatic polyamide and the like, which are laid at an angle range of from 0 to 35 degrees, preferably 10 to 30 degrees, with respect to the tire equator C.

The maximum width BW of the belt 7 is preferably in the range of 0.8 to 1.2 times the tread width.

Figure 1:
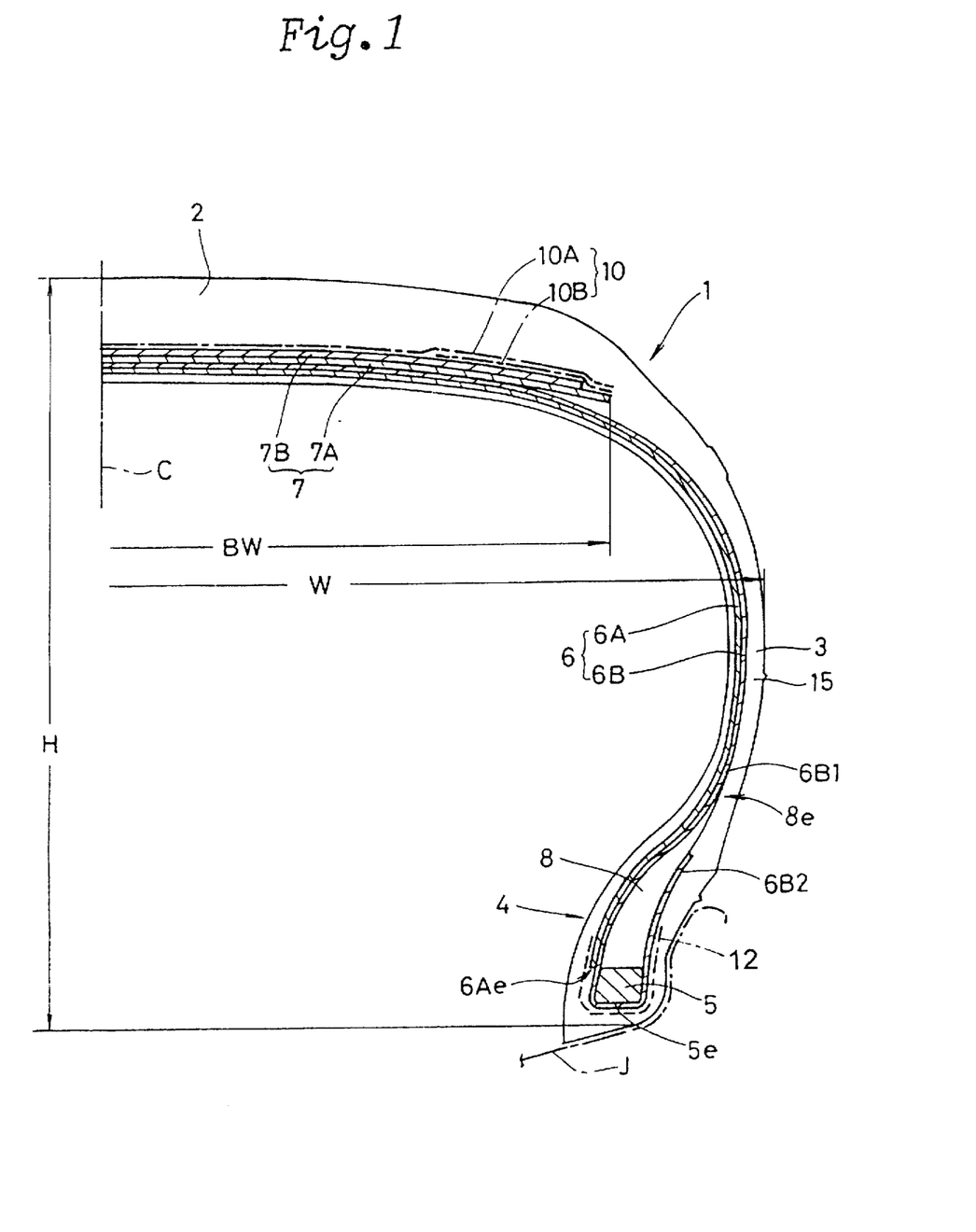
FIG. 1 is a cross sectional view of an embodiment of the present invention.
Figure 2:
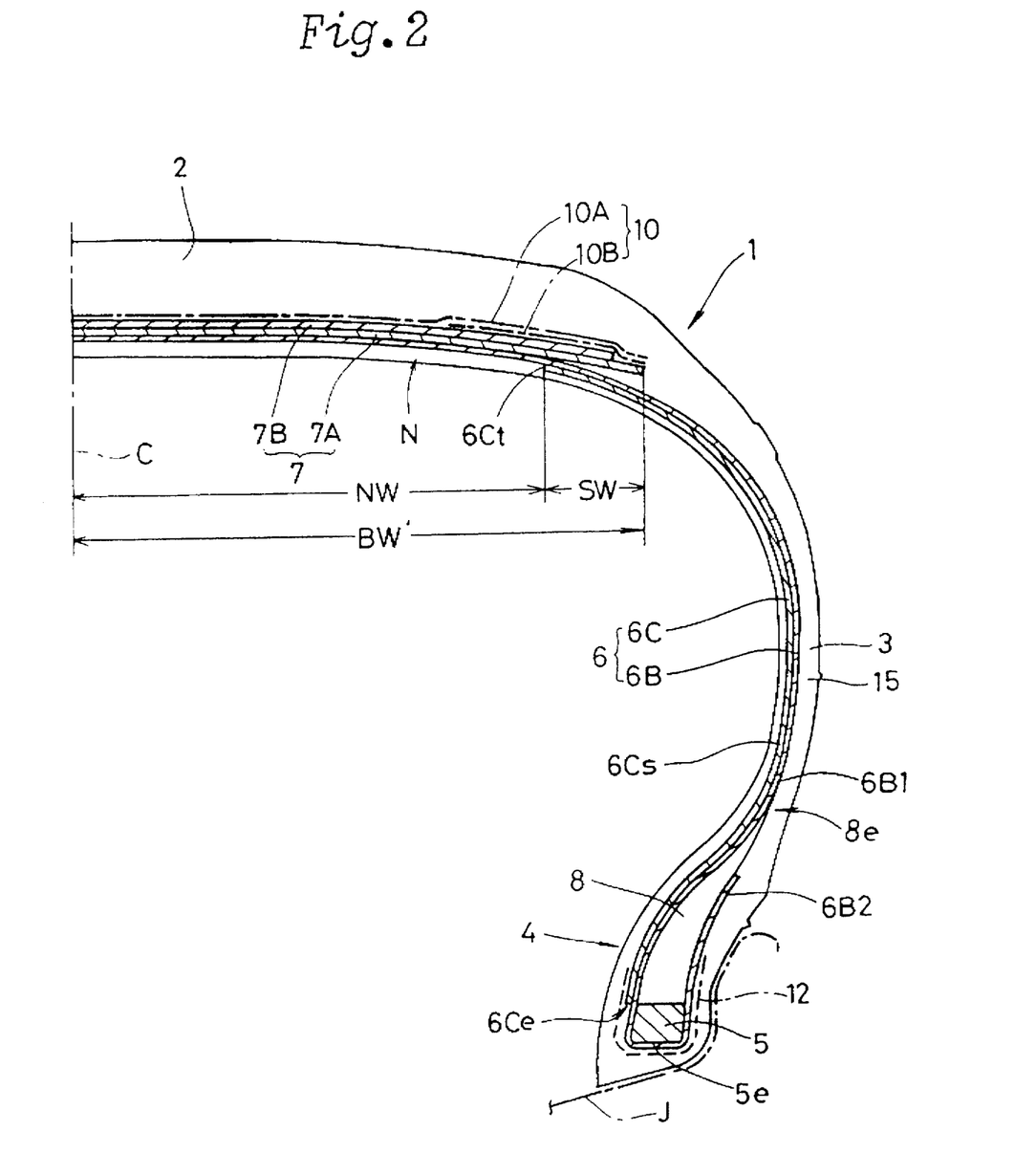
FIG. 2 is a cross sectional view of another embodiment of the present invention.

In the embodiments shown in FIGS. 1 and 2, the belt 7 consists of an inner ply 7A and an outer ply 7B disposed in different directions so that the belt cords of one ply cross the belt cords of the other ply.

The axial width of the inner belt ply 7A is larger than that of the outer belt ply 7B, and accordingly defines the maximum width BW of the belt 7.

In the embodiments, a band 10 is further disposed radially outside the belt 7 to cover at least the axial outer edges of the belt 7 to thereby prevent the belt 7 from being lifted during high speed running.

The band 10 in this example comprises a pair of narrow-width plies 10B each disposed on the radially outside of the belt 7 to cover each belt edge, and a full-width ply 10A disposed thereon to cover all over the width of the belt 7. For example, the ply 10A and plies 10B are formed by spirally winding cords, e.g. a nylon cord having a diameter smaller than that of the belt cords, at an angle of 0 to 5 degrees with respect to the tire equator C.

The above-mentioned carcass 6 consists of an inner carcass ply 6A, 6C and an outer carcass ply 6B.

Each of the carcass plies is made of organic fiber cords, e.g. nylon, polyester, rayon, aromatic polyamide and the like, arranged at an angle of 70 to 90 degrees with respect to the tire equator C.

The outer carcass ply 6B extends between the bead portions 4 and turned up around the bead core 5 in each bead portion from axially inside to axially outside of the tire, thereby having a main portion 6B1 extending continuously from axially inside of one of the bead cores 5 to axially inside of the other bead core 5, and a pair of turnup portions 6B2 each extending from the axially outside of each bead core 5.

Between the main portion 6B1 and turnup portion 6B2 in each of the bead portions 4, a bead apex 8 made of a rubber compound being harder than a sidewall rubber 15 defining the outside of the sidewall portion 3, and having for example a JIS A hardness of is 64 to 80 degrees, is disposed. The bead apex tapers and extends radially outwardly from the radially outside of the bead core 5 through a region between the main portion 6B1 and turnup portion 6B2 so as to increase the lateral stiffness of the tire in cooperation with the turnup portions 6B2.

The radially outer end 8e of the bead apex 8 is disposed radially outward of both the radially outer end of the turnup portion 6B2 and the radially outer edge of the flange of the rim J.

The above-mentioned inner carcass ply 6A, 6C is disposed adjacent to the inside of the main portion 6B1 and extends at least from the tread portion 2 to the bead portions 4 through the sidewall portions 3.

In FIG. 1, the inner carcass ply 6A extends continuously from one of the bead portions 4 to the other bead portion 4 and has a toroidal shape.

In FIG. 2, the inner carcass ply 6C is not continuous and it is composed of a pair of axially spaced pieces 6Cs with the space N located in the tread portion 2.

The inner carcass ply 6A, 6C is not turned up around the bead core 5 in each bead portion 4, and the radially inner end thereof is disposed radially outward of the radially inner end 5e of the bead core 5.

The radial distance Hb between the end 6Ae, 6Ce of the inner carcass ply and the end 5e of the bead core 5 is less than the radial distance Ha between the radially outer end 8e of the bead apex 8 and the end 5e of the bead core 5.

In the embodiments shown in FIGS. 1 and 2, the distance Hb is not more than 20 mm, and the difference Ha–Hb of the distance Ha from the distance Hb is not less than 5 mm.

If the distance Hb is not less than the distance Ha, the rigidity of the sidewall portion 3 excessively decreases, and a required maneuverability can not be maintained. Further, as the end 6Ae, 6Ce are located in a part which is bent mostly during running, the carcass cord edge loose is liable to occur near the end 6Ae, 6Ce.

If the difference Ha–Hb is less than 5 mm, as the end 6Ae, 6Ce is near the outer end 8e of the bead apex, the stress when bent concentrates near the end 6Ae, 6Ce and the upper end 8e of the bead apex and a damage is liable to occur.

If the distance Hb is more than 20 mm, as the end 6Ae, 6ce locates in a part of which deflection is largest when bent, the edge loose is liable to occur at the end 6Ae, 6Ce.

Accordingly, the distance Hb is preferably not more than 10 mm.

Figure 9:
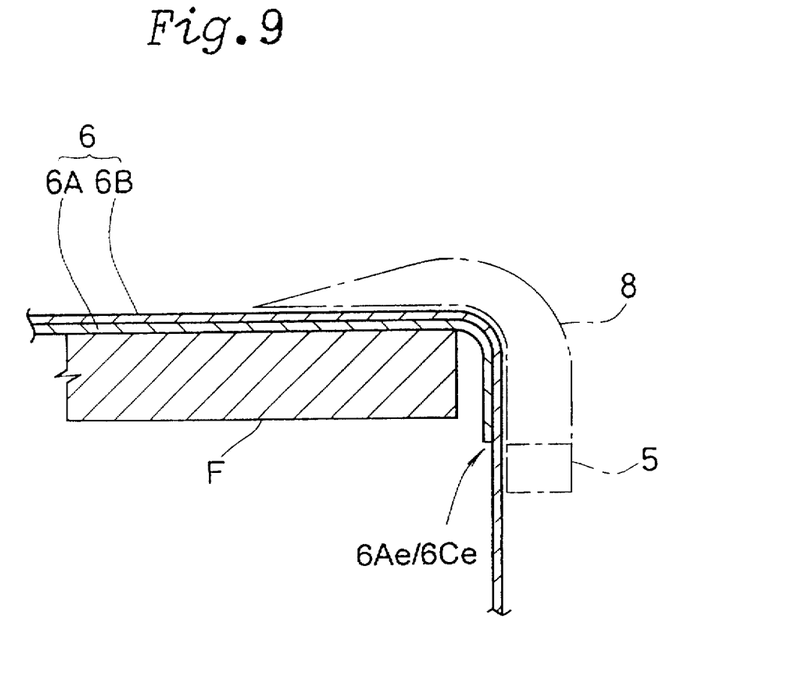
FIG. 9 is a schematic cross sectional view explaining that the carcass according to the present invention can solve the problems in the same type of manufacturing method.

In the present invention, therefore, the end of the inner carcass ply is not interposed between the outer carcass ply and the bead apex, and thereby it becomes possible to come out the inner carcass ply end to the inner surface of the tire at the time of making the tire as shown in FIG. 9.

Accordingly, the air filled space in the prior art structure is completely avoided, and further the outer carcass ply 6B can be turned up around the bead cores 5 through the shortest path, which helps to decrease the tire weight.

Further, the spring back of the inner carcass ply occurs towards the outer carcass ply, which prevents the occurence of a ply separation failure, and the tire uniformity and bead durability can be improved as mentioned above.

In the inner carcass ply 6C shown in FIG. 2, the axial inner edge 6Ct of each of the pieces 6Cs is disposed axially inward of the edge of the belt 7 by a certain distance SW. In this example, as a region N in which the inner carcass ply 6C does not exist is provided radially inside the belt 7, the tire weight can be greatly reduced corresponding to the width NW of this region.

If such region N is formed, the steering stability and durability are hardly deteriorated because the tire 1 is already provided with a sufficient rigidity by the belt plies 7A and 7B and the outer carcass ply.

The above-mentioned distance SW(=BW−NW) measured axially inwardly form the edge of the belt 7 to the edge 6Ct of the piece 6Cs is not less than 5 mm, preferably not less than 10 mm.

If the distance SW is less than 5 mm, as the edge 6Ct locates near the belt edge, a stress concentrates on this part and damages such as ply separation and the like are liable to be caused. Further, this part is decreased in the rigidity, and the steering stability is deteriorated. If the edge 6Ct is located axially outward of the belt edge, the rigidity between the edge 6Ct and the belt edge becomes very small, and stress concentration and damage are liable to occur in this part. For the tire weight reduction and tire durability, the distance SW is preferably about 10 mm.

As the outer carcass ply is wider than the inner carcass ply, the inner ply is prevented from being crease at the time of shaping the carcass. Further, the edge part of the inner carcass ply which is bent by the former as shown in FIG. 9 causes spring back towards the outer carcass ply, and the ply separation can be controlled.

In the embodiments shown in FIGS. 1 and 2, each bead portion 4 is provided with a chafer 12 for protecting the end 6Ae, 6Ce.

The chafer 12 is wrapped around the bead cores 5 to have a U-shaped cross-sectional shape and comprises an axially inner portion 13A extending radially outwardly to cover the end 6Ae, 6Ce and an axially outer portion 13B extending radially outwardly in contact with the axially outer surface of the turnup portions 6b of the outer carcass ply 6B.

Figure 3:
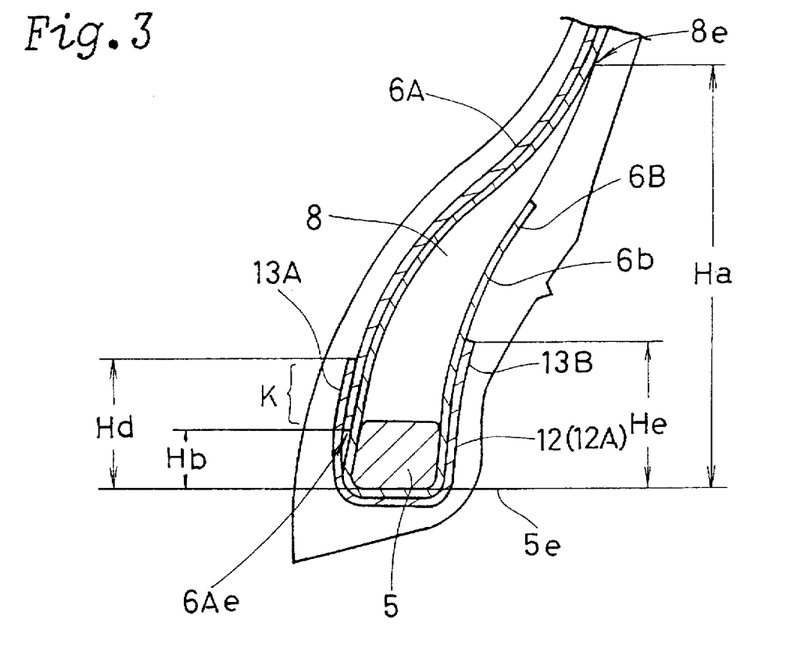
FIG. 3 is a cross sectional view of the bead portion showing an example of a chafer.

FIG. 3 shows an example of the chafer 12, which is made of organic fiber cords, e.g. nylon, polyester, rayon, aromatic polyamide and the like. The chafer 12A in this example consists of one ply of nylon cords. The diameter thereof is preferably not more than 0.5 times the diameter of the carcass cords.

Figure 4:
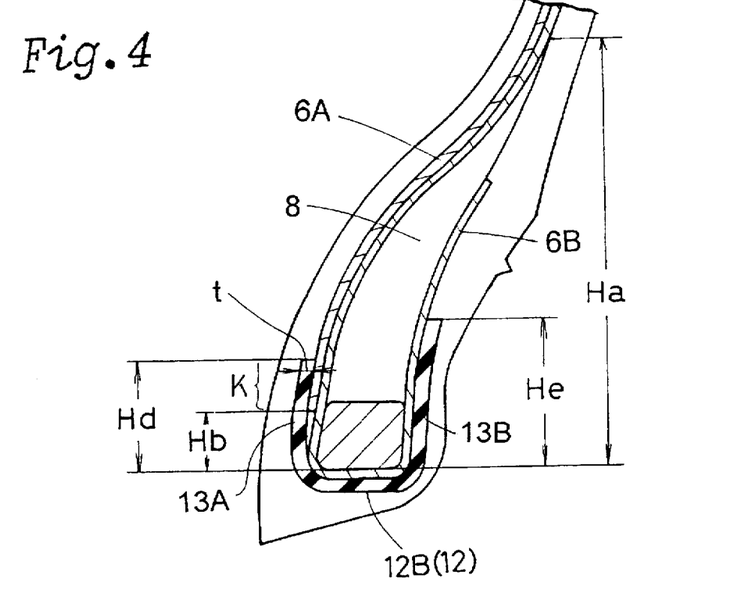
FIG. 4 is a cross sectional view of the bead portion showing another example of a chafer.

FIG. 4 shows another example of the chafer 12, which is made of only hard rubber compound. The JIS A hardness thereof is 64 to 74 degrees, preferably 66 to 72 degrees. To control the edge loose at the end 6Ae, 6Ce, the thickness (t) of the inner portion 13A is preferably in the range of from 1 to 4 mm. If the thickness (t) is less than 1 mm, the effect to control the edge loose is insufficient. If it exceeds 4 mm, the weight is liable to increase undesirable.

The axially inner portion 13A overlaps with the inner carcass ply 6. The overlap K in the radial direction is preferably in the range of from 5 to 20 mm. Accordingly, the distance Hd of the outer end of the axially inner portion 13A from the inner end 5e of the bead core is in the range of from 5 to 40 mm.

As the axially inner portion 13A cover the end 6Ae, 6Ce, the edge loose at the end 6Ae, 6Ce is effectively prevented.

The axially outer portion 13B preferably terminates on the axially outside of the bead apex 8, for mitigating the stress concentration. The distance He of the outer end of the axially outer portion 13B from the inner end 5e of the bead core is less than the distance Ha of the outer end of the bead apex.

WORKING EXAMPLES

According to the specifications given in Tables 1–3, 215/60R16 passenger tires were made and tested for the ride comfort, steering stability, noise, durability, tire production efficiency, tire weight, radial force variation RFV, lateral force variation LFV, and conicity CON. The test results are also indicated in the same Tables.

Ride comfort and Steering stability test

Running a 3000 cc FR car on a dry asphalt road, these performances of each test tire were evaluated into ten ranks by the driver's feeling. The higher the rank, the better the performance. The inner pressure was 2.1 kgf/sq.cm, and the rim size was 6.5JJX16.

Noise test

Running the same car as in the above-mentioned test on a rough asphalt road at a constant speed of 50 km/h, the noise was measured in the car using microphones set at a position (Front) of the left ear of the driver and a position (Rear) of the center of the rear seat at the same hight as the ear.

Durability test

After each test tire run on a drum for 50000 km distance under the following conditions, the tire was inspected whether it was damaged or not.

Inner pressure 1.9 kgf/sq.cm
Tire load 800 kg
Rim size 6.5JJX16
Running speed 80 km/h
Drum diameter 0.9 m The symbols used in the tables are as follows:

o The tire run the whole distance of 50000 km. There was no abnormality in the external and internal.

A1 The tire run the whole distance of 50000 km. There was no abnormality in the external, but edge loose occurred at the end.

A2 The tire run the whole distance of 50000 km. Swelling was found in the external, and a ply loose starting from an edge loose was found at the end.

A6 The tire run the whole distance of 50000 km. There was no abnormality in the external, but a belt edge loose was found.

X1 The tire run only 39000 km. A damage to the external due to ply edge loose was found, and air leakage was occurred.

X2 The tire run only 31000 km. A damage to the external due to ply edge loose was found, and air leakage was occurred.

X3 The tire run only 23000 km. A damage to the external due to ply edge loose was found, and air leakage was occurred.

X4 The tire run only 30000 km. A damage to the external due to ply edge loose was found, and air leakage was occurred.

X5 The tire run only 35000 km. A damage to the external due to ply edge loose was found, and air leakage was occurred.

X6 The tire run only 21000 km. A damage to the external due to belt edge loose was found, and air leakage was occurred.

X7 The tire run 23000 km. A damage to the external due to belt edge loose was found, and air leakage was occurred.

Tire production efficiency test

The test tires were compared with each other in respect of the time required to make the carcass.

The symbols used in the tables are as follows:

o Excellent.

A3 Inferior. Swelling due to the occurence of air filled space was found in the bead portion. The fraction defective was 31% (5/16).

Δ4 Inferior. Swelling due to the occurence of air filled space was found in the bead portion. The fraction defective was 38% (6/16).

Tire uniformity test

RFV, LFV and CON were measured according to the JASO-C607 procedure. The results are shown in the tables using the mean value for sixteen tires. The smaller the value, the better the uniformity.

From the tests, it was confirmed that the pneumatic radial tires according to the present invention are improved in bead durability and production efficiency, while reducing the tire weight.

The present invention is suitably applied to a high-speed tire for four-wheel vehicles such as sport type passenger cars.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Tire | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Carcass | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| Cord | polyester 1500d/2 | polyester 1500d/2 | polyester 1500d/2 | polyester 1500d/2 | polyester 1500d/2 | polyester 1500d/2 | polyester 1500d/2 | polyester 1500d/2 | polyester 1500d/2 | polyester 1500d/2 | polyester 1500d/2 |
| Chafer | FIG. 3 | FIG. 3 | FIG. 3 | FIG. 3 | FIG. 3 | FIG. 3 | FIG. 3 | FIG. 3 | FIG. 4 | FIG. 4 | FIG. 3 |
| Cord chafer | | | | | | | | | non | non | |
| Cord *1 | nylon 440d (MoF) | nylon 440d (MoF) | nylon 440d (MoF) | nylon 440d (MoF) | nylon 440d (MoF) | nylon 440d (MoF) | nylon 440d (MoF) | nylon 440d (MoF) | — | — | nylon 440d (MoF) |
| Rubber chafer | non | non | non | non | non | non | non | non | | | non |
| JIS A hardness (deg) | — | — | — | — | — | — | — | — | 70 | 70 | — |
| Thickness t (mm) | — | — | — | — | — | — | — | — | 2 | 2 | — |
| Ha (mm) | 40 | 40 | 40 | 40 | 40 | 40 | 40 | 40 | 40 | 40 | 40 |
| Hb (mm) | 5 | 10 | 20 | 35 | 5 | 10 | 20 | 35 | 20 | 5 | 20 |
| Ha–Hb (mm) | 35 | 30 | 20 | 5 | 35 | 30 | 20 | 5 | 35 | 35 | 20 |
| Hc (mm) | 20 | 20 | 20 | 20 | 60 | 60 | 60 | 60 | 20 | 20 | 20 |
| Hd (mm) | 15 | 15 | 15 | 15 | 15 | 15 | 15 | 15 | 15 | 25 | 25 |
| He (mm) | 25 | 25 | 25 | 25 | 25 | 25 | 25 | 25 | 25 | 25 | 25 |
| Ride comfort | 6 | 6 | 6 | 6.5 | 6 | 6 | 6 | 6.5 | 6 | 6 | 6 |
| Steering stability | 6 | 6 | 6 | 6 | 6 | 6 | 6 | 6 | 6 | 6 | 6 |
| Noise (dBA) | | | | | | | | | | | |
| Front | 63.2 | 63.2 | 63.1 | 63.1 | 63.2 | 63.2 | 63.2 | 63.2 | 63.1 | 63.0 | 63.1 |
| Rear | 65.0 | 65.0 | 65.0 | 65.0 | 65.1 | 65.1 | 65.1 | 65.0 | 65.0 | 65.0 | 65.0 |
| Durability | ◯ | ◯ | Δ1 | Δ2 | ◯ | ◯ | ◯ | Δ2 | ◯ | ◯ | ◯ |
| Production efficiency | ◯ | ◯ | ◯ | ◯ | ◯ | ◯ | ◯ | ◯ | ◯ | ◯ | ◯ |
| Tire weight (kg) | 10.29 | 10.26 | 10.20 | 10.12 | 10.78 | 10.75 | 10.69 | 10.61 | 10.32 | 10.23 | 10.22 |
| RFV | 5.05/1.11 | 5.10/1.11 | 5.04/1.03 | 4.89/1.06 | 4.92/0.72 | 4.93/0.81 | 5.01/0.89 | 5.82/1.02 | 5.09/1.08 | 5.06/0.99 | 5.12/1.07 |
| LFV | 2.95/0.89 | 2.93/0.88 | 2.94/0.92 | 2.53/0.88 | 2.77/0.85 | 2.78/0.86 | 3.12/0.82 | 3.22/0.94 | 2.93/0.90 | 2.99/0.89 | 2.95/0.93 |
| Conicity | −0.45/0.72 | −0.50/0.73 | 0.23/0.82 | 0.12/0.73 | −0.35/0.69 | 0.01/0.70 | −0.22/0.75 | 0.55/0.83 | −0.51/0.74 | 0.21/0.79 | 0.24/0.85 |

*1 MoF = monofilament

TABLE 2

Figure 10:
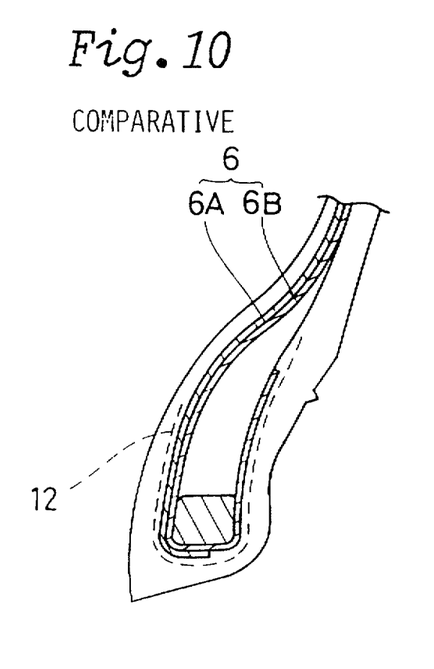
FIGS. 10 and 11 are cross sectional views showing the carcass structures used in comparison tests.

| Tire | Ref. 1 | Ref. 2 | Ref. 3 | Ref. 4 | Pr 1 | Pr 2 | Pr 3 | Pr 4 |
|---|---|---|---|---|---|---|---|---|
| Carcass | FIG. 1 | FIG. 1 | FIG. 1 | FIG. 10 | FIG. 5 | FIG. 5 | FIG. 7 | FIG. 7 |
| Cord | polyester 1500d/2 | polyester 1500d/2 | polyester 1500d/2 | polyester 1500d/2 | polyester 1500d/2 | polyester 1500d/2 | polyester 1500d/2 | polyester 1500d/2 |
| Chafer | FIG. 3 | FIG. 3 | FIG. 3 | FIG. 3 | FIG. 3 | FIG. 3 | FIG. 3 | FIG. 3 |
| Cord chafer | | | | | | | | |
| Cord *1 | nylon 440d (MoF) | nylon 440d (MoF) | nylon 440d (MoF) | nylon 440d (MoF) | nylon 440d (MoF) | nylon 440d (MoF) | nylon 440d (MoF) | nylon 440d (MoF) |
| Rubber chafer | non | non | non | non | non | non | non | non |
| Ha (mm) | 40 | 40 | 40 | 40 | 40 | 40 | 40 | 40 |
| Hb (mm) | 40 | 40 | 45 | minus | — | — | Hb' = 5 | Hb' = 5 |
| Ha–Hb mm | 0 | 0 | −5 | — | — | — | 35 | 35 |
| Hc (mm) | 20 | 60 | 20 | 20 | 20/10 | 60/20 | 20 | 60 |
| Hd (mm) | 15 | 15 | 15 | 15 | 15 | 15 | 15 | 15 |
| He (mm) | 25 | 25 | 25 | 25 | 25 | 25 | 25 | 25 |
| Ride comfort | 7 | 7 | 6 | 6 | 6 | 6 | 6 | 6 |
| Steering stability | 5.5 | 5.5 | 6 | 6 | 6 | 6 | 6 | 6 |

TABLE 2-continued

| Tire | Ref. 1 | Ref. 2 | Ref. 3 | Ref. 4 | Pr 1 | Pr 2 | Pr 3 | Pr 4 |
|---|---|---|---|---|---|---|---|---|
| Noise (dBA) | | | | | | | | |
| Front | 63.1 | 63.1 | 63.2 | 63.2 | 63.3 | 63.3 | 63.2 | 63.2 |
| Rear | 64.9 | 65.0 | 65.1 | 65.0 | 65.2 | 65.3 | 65.0 | 65.1 |
| Durability | X2 | X3 | X1 | ○ | ○ | ○ | ○ | ○ |
| Production efficiency | ○ | ○ | ○ | ○ | ○ | ○ | Δ3 | Δ4 |
| Tire weight (kg) | 10.08 | 10.57 | 10.04 | 10.31 | 10.45 | 10.93 | 10.32 | 10.80 |
| RFV | 5.32/1.20 | 9.59/1.06 | 5.26/1.21 | 7.20/1.68 | 5.55/1.24 | 5.62/1.21 | 6.21/1.30 | 6.03/1.08 |
| LFV | 3.01/1.03 | 3.42/0.89 | 3.12/1.02 | 3.84/1.48 | 3.05/0.93 | 3.12/0.88 | 4.29/1.08 | 4.01/1.11 |
| Conicity | 1.25/1.00 | 1.10/0.98 | −1.21/1.10 | 3.38/1.58 | 1.85/1.03 | 1.90/1.11 | 2.03/1.22 | 2.89/1.20 |

TABLE 3

Figure 11:
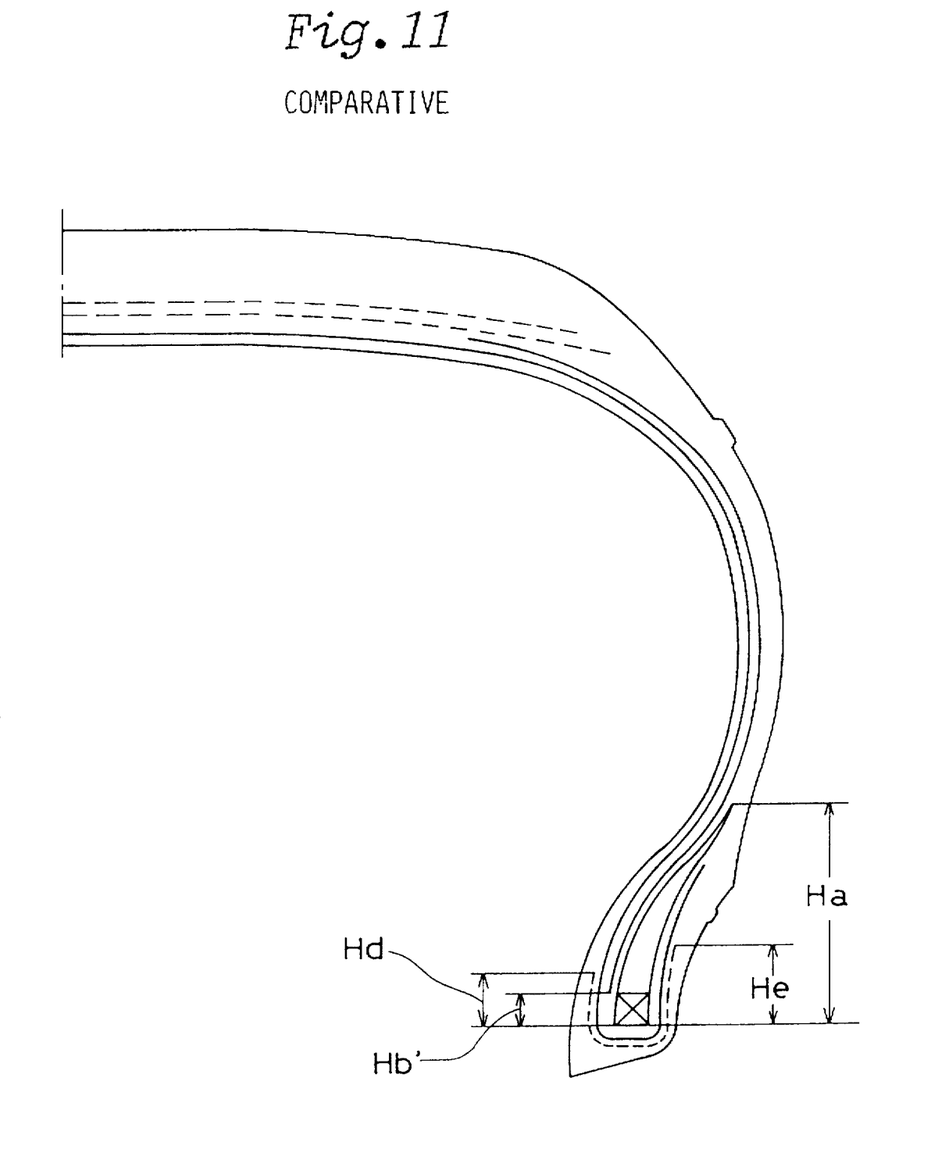

| Tire | Ex. 12 | Ex. 13 | Ref. 5 | Ref. 6 | Ex. 14 | Ref. 7 | Ref. 8 | Ex. 15 | Ref. 9 |
|---|---|---|---|---|---|---|---|---|---|
| Carcass | FIG. 2 | FIG. 2 | FIG. 2 | FIG. 2 | FIG. 2 | FIG. 2 | FIG. 2 | FIG. 2 | FIG. 11 |
| Cord | polyester 1500d/2 | polyester 1500d/2 | polyester 1500d/2 | polyester 1500d/2 | polyester 1500d/2 | polyester 1500d/2 | polyester 1500d/2 | polyester 1500d/2 | polyester 1500d/2 |
| Chafer | FIG. 3 | FIG. 3 | FIG. 3 | FIG. 3 | FIG. 3 | FIG. 3 | FIG. 3 | FIG. 4 | FIG. 3 |
| Cord chafer | | | | | | | | non | |
| Cord *1 | nylon 440d (MoF) | nylon 440d (MoF) | nylon 440d (MoF) | nylon 440d (MoF) | nylon 440d (MoF) | nylon 440d (MoF) | nylon 440d (MoF) | | nylon 440d (MoF) |
| Rubber chafer | non | non | non | non | non | non | non | | non |
| JIS A hardness (deg) | — | — | — | — | — | — | — | 70 | — |
| Thickness t (mm) | — | — | — | — | — | — | — | 2 | — |
| Ha (mm) | 40 | 40 | 40 | 40 | 40 | 40 | 40 | 40 | 40 |
| Hb (mm) | 5 | 35 | 40 | 45 | 35 | 35 | 35 | 35 | 35 |
| Ha-Hb (mm) | 35 | 5 | 0 | −5 | 5 | 5 | 5 | 5 | |
| Hc (mm) | 20 | 20 | 20 | 20 | 20 | 20 | 20 | 20 | 20 |
| Hd (mm) | 15 | 15 | 15 | 15 | 15 | 15 | 15 | 15 | 15 |
| He (mm) | 25 | 25 | 25 | 25 | 25 | 25 | 25 | 25 | 25 |
| BW' (mm) | 77 | 77 | 77 | 77 | 77 | 77 | 77 | 77 | 77 |
| NW (mm) | 67 | 67 | 67 | 67 | 72 | 77 | 87 | 67 | 67 |
| SW (mm) | 10 | 10 | 10 | 10 | 5 | 0 | −10 | 10 | 10 |
| Ride comfort | 6 | 6.5 | 7.0 | 7.0 | 6 | 6 | 6.5 | 6 | 6 |
| Steering stability | 6 | 6 | 5.5 | 5.0 | 6 | 6 | 6 | 6 | 6 |
| Noise (dBA) | | | | | | | | | |
| Front | 63.3 | 63.3 | 63.2 | 63.4 | 63.2 | 63.2 | 63.1 | 63.5 | 63.2 |
| Rear | 64.9 | 65.0 | 65.0 | 65.1 | 65.0 | 65.1 | 65.1 | 65.0 | 65.0 |
| Durability | ○ | ○ | X4 | X5 | Δ6 | X6 | X7 | ○ | ○ |
| Production efficiency | ○ | ○ | ○ | ○ | ○ | ○ | ○ | ○ | Δ3 |
| Tire weight (kg) | 10.19 | 10.02 | 9.98 | 9.94 | 10.17 | 10.15 | 10.11 | 10.21 | 10.19 |
| RFV | 5.40/0.98 | 5.29/1.03 | 4.99/0.91 | 5.13/0.87 | 4.88/0.90 | 5.06/0.98 | 5.56/0.99 | 4.94/0.88 | 5.93/1.08 |
| LFV | 3.55/0.86 | 3.67/0.77 | 3.51/0.81 | 2.97/0.91 | 3.01/0.83 | 3.14/0.93 | 3.26/1.03 | 2.98/0.92 | 4.13/1.01 |
| Conicity | 0.21/0.79 | 0.38/0.81 | 0.97/0.83 | 0.73/0.78 | 0.30/0.86 | −0.32/0.84 | −0.53/0.95 | 0.23/0.81 | 1.61/0.99 |

We claim:

1. A pneumatic radial tire comprising:

a tread portion, a pair of axially spaced bead portions with a bead core therein, a pair of sidewall portions therebetween, a carcass comprising an outer ply and an inner ply, the outer ply comprising a main portion extending continuously from axially inside of one of the bead cores to axially inside of the other bead core through the sidewall portions and tread portion of the tire, and a pair of turnup portions each turned up around each of the bead cores from axially inside to axially outside of the tire, the entire inner ply disposed inside and adjacent to said main portion and extending at least from the tread portion to the bead portions through the sidewall portions, the inner ply having radial inner ends which are not wrapped around the bead cores, a belt disposed radially outside the carcass and inside the tread portion, the belt comprising at least one ply of cords laid at an angle of from 0 to 35 degrees with respect to the circumferential direction of the tire, and a rubber bead apex disposed between the main portion and each turnup portion of the carcass and extending radially outwardly from each of the bead cores, wherein the radially inner end of the inner ply is disposed radially inward of the radial outer end of the rubber bead apex, each bead portion is provided with a chafer covering one of said radial inner ends of the inner ply, and the axially inner portion of the chafer overlaps the inner carcass ply in an amount of from 5 to 20 mm.

2. The pneumatic radial tire according to claim 1, wherein the inner carcass ply extends continuously from the axially inside of one of the bead cores to the axially inside of the other bead core.

3. The pneumatic radial tire according to claim 1, wherein the inner carcass ply consists of a pair of axially spaced pieces the space of which is located in the tread portion, the axially inner edges of the pieces being disposed axially inward of the edges of the belt.

4. The pneumatic radial tire according to claim 1, wherein the inner carcass ply consists of a pair of axially spaced pieces the space of which is located in the tread portion, the axially inner edges of the pieces being disposed axially inward of the edges of the belt by a distance (SW) of not less than 10 mm.

5. The pneumatic radial tire according to claim 1, wherein the carcass consists of the inner carcass ply and the outer carcass ply.

6. The pneumatic radial tire according to claim 1, wherein said chafer is made of organic fiber cords.

7. The pneumatic radial tire according to claim 6, wherein said chafer consists of one ply of nylon cords, the cord diameter of which is not more than 0.5 times the carcass cord diameter.

8. The pneumatic radial tire according to claim 1, wherein said chafer consists of a hard rubber compound having a JIS A hardness of 64 to 74 degrees.

* * * * *